C. WHEELER.
Drone Trap for Bee Hives.
No. 10,877.
Patented May 9, 1854.
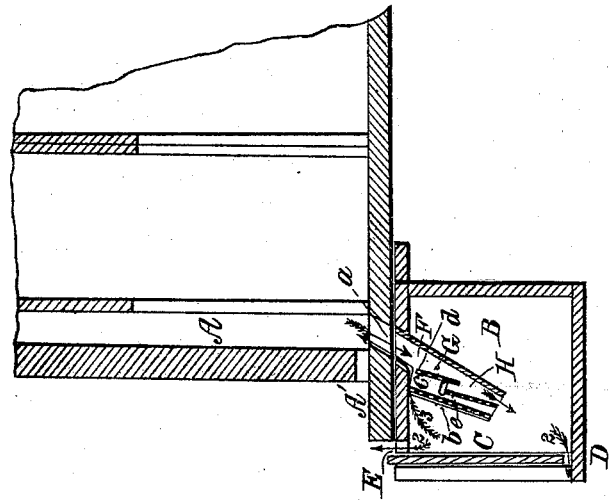
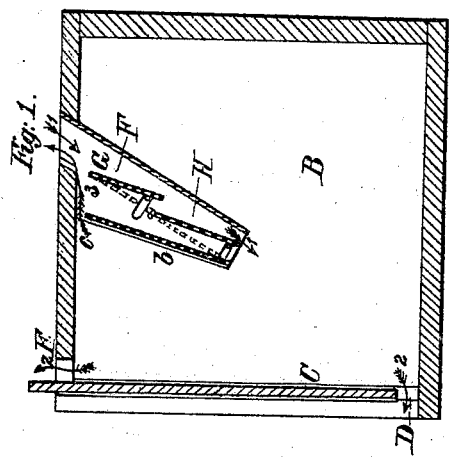
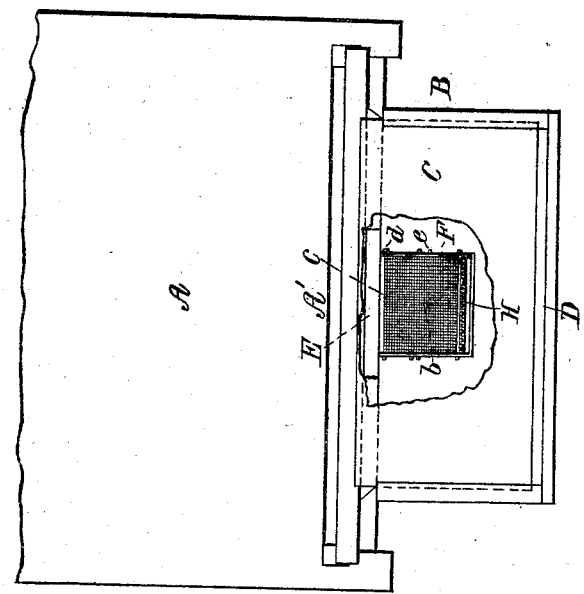

UNITED STATES PATENT OFFICE.

CLARK WHEELER, OF LITTLE VALLEY, NEW YORK.

BEEHIVE.

Specification of Letters Patent No. 10,877, dated May 9, 1854.

*To all whom it may concern:*

Be it known that I, CLARK WHEELER, of Little Valley, in the county of Cattaraugus and State of New York, have invented a new and useful Improvement in Drone-Traps for Bee-hives; and I do hereby declare that the following is a full, clear, and exact description of the same, reference being had to the accompanying drawings, forming part of this specification, in which—

Figure 1, is a vertical transverse section of the drone trap. Fig. 2, is a front view of the same, showing its application to a hive, a portion of the glass front of the trap being broken out. Fig. 3, is a vertical section of the same. In this view, the trap and hive are represented as being arranged for the egress of the bees, and the entrapping of the drones.

Similar letters of reference in each of the several figures indicate corresponding parts.

This invention relates to a new, useful, and effectual method of entrapping and destroying the drone bees of hives without interfering with or destroying the egress or ingress of the working bees of the hive; and it consists in arranging, in close relation to the egress and ingress passage of the working bees, a rectangular, or other suitable shaped box—having a transparent sliding front for the admission of light, to decoy the drone into the box; and also two or more passages—one of peculiar construction, for entrapping the drones, after they have tried to escape through the passage of the working bees, and found it impossible—and the others for the allowing of the escape of such working bees as may, by mistake, get into the drone trap. The said drone passage consisting of a reticulated tube, which is set inclining, and is supplied with one, or more, reticulated pendent valves, which are so set and arranged, that they present a broad entrance, and a narrow escape passage to the drones; and consequently, as the drones force their way through the escape passage; the lower ends of the pendent valves will be caused to swing outward sufficiently far to allow of their escape; as soon as which is effected, the valves will automatically assume their position, and contract the escape passage, sufficiently to prevent the return of the drones, but not that of such working bees as may by mistake, get into the trap.

A, in the accompanying drawings, represents a portion of a hive. This is shown merely for the purpose of illustrating the application of my drone trap.

A′, represents the egress passage for the working bees.

B, is the drone box or trap. It is made of rectangular form, or other suitable shape.

C, is the sliding glass front, for admitting light to decoy the drones into the box, after they have endeavored to pass out with the bees, and found it impossible to do so. This front, also, by being movable, can be raised by hand, so as to form an escape passage, D, under its bottom, for such working bees, as by chance, pass into the trap. It can be taken out entirely when it is desired to remove the dead or entrapped drones from the hive.

E, is another escape passage for the bees, which may pass by mistake into the trap. This passage is formed between the front edge of the top of the drone box, and the transparent sliding door, as shown in Figs. 1, 2, and 3.

F, is the drone passage communicating with the passage, *a*, of the hives; passage, F′, is set inclining as shown in Figs. 2 and 3. It consists of a metal tube having a reticulated front, *b*,—said front serving to admit light to attract the drones. Between the top of this front, and the top of the box, an escape passage, *c*, for the working bees, which by mistake, get into the drone trap, is formed.

G, H, are the pendent valves, which are set and arranged, as shown in the drawing, so as to form gradually tapering passages, as shown in the drawings, Figs. 2 and 3; said passages being larger at top than at bottom. The valves, G, H, swing on centers, *d*, *e*, as they are operated upon by the drones, which takes place after the drones find it impossible to escape by the working bees passage. These valves, by being encased in the tube, cannot be prevented from operating by the drones resting upon them; the reticulated front effectually confining them.

To use this trap, and thereby expel the superabundance of drone-bees from the hive, it is necessary to append it to the bottom of the hive and in near relation to the entrance of the same, and so arrange it, that the opening, F, in the top of the trap will come directly in line with the opening, *a*, in the hive; this being properly arranged and secured, the entrance for the working bees, between the bottom board and front of the hive, is opened, which entrance is of suitable size for the worker to pass out, but not large enough to allow the drone bees to escape. Now, it will be evident, that, as soon as the drones attempt to pass through the egress passage of the working bees, and find it impossible, they will, being attracted by light from the transparent front, seek an escape through the tube, F, as shown by the arrow, 1; and in doing so, will force the valves to the position shown in red, in Fig. 1, and pass into the box arranged for their reception. As soon as they escape into the box, the valves close, or again assume the position shown in black in Figs. 1 and 2,—thus shutting off the return of the drones to the hive through this tube. The drones are suffered to remain in this box, one or two days, to die, and are then removed through the transparent sliding door.

In case any of the working bees should, by chance, get into this trap, they pass out as indicated by the arrows, 2, and 3, through the several passages provided for their escape, which passages will not admit of a drone passing through them owing to his body being nearly twice as large as a working bee.

This simple and effective drone trap, which is employed, when a superabundance of drones accumulate in the hive, for the purpose of lessening their number, can be applied to almost any hive in use; but it is more particularly applicable to "Wheeler's Patent Electric Hive", partly represented in the drawing.

I do not claim either the box, A, the pendant valves or reticulated screen, separately, or independent of each other, as they have been used before in moth traps; but What I do claim as my invention and desire to secure by Letters Patent is:—

The drone trap, constructed as set forth, and operating in the manner herein described and shown in the drawing.

CLARK WHEELER.

Witnesses:
S. H. WALES,
JNO. W. HAMILTON.